(12) United States Patent
Miyamoto et al.

(10) Patent No.: US 6,595,028 B1
(45) Date of Patent: Jul. 22, 2003

(54) CHEMICAL REINFORCED GLASS SUBSTRATE HAVING DESIRABLE EDGE PROFILE AND METHOD OF MANUFACTURING THE SAME

(75) Inventors: Takemi Miyamoto, Yamanashi (JP); Hideki Isono, Yamanashi (JP)

(73) Assignee: Hoya Corporation, Tokyo (JP)

( * ) Notice: Subject to any disclaimer, the term of this patent is extended or adjusted under 35 U.S.C. 154(b) by 140 days.

(21) Appl. No.: 09/676,664

(22) Filed: Oct. 2, 2000

(30) Foreign Application Priority Data

Sep. 30, 1999 (JP) .......................................... 11-280779

(51) Int. Cl.$^7$ ................................................ C03C 15/00
(52) U.S. Cl. ..................... 65/30.14; 65/30.1; 65/30.13; 65/31; 65/60.4; 65/61
(58) Field of Search .................. 65/30.1, 30.13, 65/30.14, 31, 60.4, 61

(56) References Cited

U.S. PATENT DOCUMENTS 3,843,472 A * 10/1974 Toussaint et al. ........... 65/30.14
3,981,709 A * 9/1976 Kondo et al. ............... 65/30.14
6,332,338 B1 * 12/2001 Hashimoto et al. ......... 65/30.14
6,395,634 B1 * 5/2002 Miyamoto .................. 65/30.14

FOREIGN PATENT DOCUMENTS

| JP | 5-89459 | 4/1993 |
| JP | 5-290365 | 11/1993 |

* cited by examiner

*Primary Examiner*—Michael Colaianni
(74) *Attorney, Agent, or Firm*—Sughrue Mion, PLLC

(57) ABSTRACT

In a method of manufacturing a chemical reinforced glass substrate, consideration is previously made about a relationship between conditions of chemical reinforcement for a glass substrate and deformation caused by the chemical reinforcement at an edge portion of the glass substrate. The glass substrate is chemically reinforced on the basis of the relationship so that an edge profile is shaped into a desirable edge profile during the chemical reinforcement. The resultant chemical reinforced glass substrate is flat and smooth in a wide area and effective to improve a recording density and to avoid head crashes.

9 Claims, 7 Drawing Sheets

3.5 inch in diameter

| Sample No. | Reinforcement Temperature | Reinforcement Time | Variation of Outside Diameter | Variation of Inside Diameter | Variation of Ski-Jump | Thickness of Compressive Stress Layer | Compressive Stress | Tensile Stress | Transverse Rupture Strength |
|---|---|---|---|---|---|---|---|---|---|
| 1-1 | 340°C | 1.5hr | 0.020mm | 0.006mm | 0 | 75.1 μm | 13.8kg/mm² | 2.0kg/mm² | 30.0kgf |
| 1-2 | 340°C | 2hr | 0.024mm | 0.009mm | 0.004 μm | 79.8 μm | 13.8kg/mm² | 2.0kg/mm² | 30.4kgf |
| 1-3 | 360°C | 1.5hr | 0.027mm | 0.009mm | 0.008 μm | 79.8 μm | 13.7kg/mm² | 2.5kg/mm² | 31.4kgf |
| 1-4 | 360°C | 2hr | 0.031mm | 0.008mm | 0.010 μm | 84.5 μm | 13.9kg/mm² | 2.8kg/mm² | 32.6kgf |
| 1-5 | 380°C | 1.5hr | 0.034mm | 0.010mm | 0.012 μm | 93.9 μm | 14.0kg/mm² | 2.6kg/mm² | 33.8kgf |
| 1-6 | 380°C | 2hr | 0.039mm | 0.011mm | 0.030 μm | 112.7 μm | 14.5kg/mm² | 2.6kg/mm² | 35.7kgf |
| 1-7 | 380°C | 4hr | 0.056mm | 0.015mm | 0.035 μm | 140.8 μm | 20.5kg/mm² | 2.7kg/mm² | 35.8kgf |

FIG. 7

2.5 inch in diameter

| Sample No. | Reinforcement Temperature | Reinforcement Time | Variation of Outside Diameter | Variation of Inside Diameter | Variation of Ski-Jump | Thickness of Compressive Stress Layer | Compressive Stress | Tensile Stress | Transverse Rupture Strength |
|---|---|---|---|---|---|---|---|---|---|
| 2-1 | 340°C | 0.6hr | 0.010mm | 0.002mm | 0.000μm | 40.2μm | 6.2kg/mm² | 0.9kg/mm² | 10.3kgf |
| 2-2 | 340°C | 1.5hr | 0.025mm | 0.007mm | 0.002μm | 56.3μm | 10.9kg/mm² | 1.6kg/mm² | 22.2kgf |
| 2-3 | 340°C | 2hr | 0.028mm | 0.006mm | 0.002μm | 70.4μm | 11.1kg/mm² | 2.0kg/mm² | 22.6kgf |
| 2-4 | 360°C | 1.5hr | 0.029mm | 0.009mm | 0.004μm | 75.1μm | 11.3kg/mm² | 2.0kg/mm² | 25.2kgf |
| 2-5 | 360°C | 2hr | 0.030mm | 0.009mm | 0.006μm | 84.5μm | 13.6kg/mm² | 2.7kg/mm² | 25.3kgf |
| 2-6 | 380°C | 1.5hr | 0.034mm | 0.012mm | 0.012μm | 84.5μm | 14.2kg/mm² | 3.85kg/mm² | 26.4kgf |
| 2-7 | 380°C | 2hr | 0.036mm | 0.013mm | 0.020μm | 84.5μm | 15.3kg/mm² | 4.1kg/mm² | 24.5kgf |
| 2-8 | 380°C | 4hr | 0.040mm | 0.015mm | 0.040μm | 131.4μm | 20.2kg/mm² | 5.35kg/mm² | 23.8kgf |

FIG. 8

| ASKER-C | 54 | 58 | 60 | 64 | 66 | 68 | 70 | 80 |
|---|---|---|---|---|---|---|---|---|
| MEAN VALUE * | 0.244 | 0.194 | 0.06 | 0.03 | −0.08 | −0.113 | −0.159 | −0.280 |
| MAXIMUM VALUE | 0.419 | 0.338 | 0.15 | 0.096 | 0.15 | −0.010 | −0.010 | −0.008 |
| MINIMUM VALUE | 0.103 | 0.033 | −0.08 | −0.042 | −0.30 | −0.255 | −0.259 | −0.389 |

*MEAN VALUE OF 100 SAMPLES

CHEMICAL REINFORCED GLASS SUBSTRATE HAVING DESIRABLE EDGE PROFILE AND METHOD OF MANUFACTURING THE SAME

BACKGROUND OF THE INVENTION

This invention relates to a chemical reinforced glass substrate and an information recording medium including the glass substrate and also to a method of manufacturing the chemical reinforced glass substrate and the information medium.

As one of information recording media, a magnetic disk mounted on a hard disk drive (HDD) is known in the art.

Recently, it is strongly required to increase storage capacity of the magnetic disk. As a result, an extension of a recording region on the magnetic disk and a high recording density of the recording become an emergency matter.

The hard disk drive includes a magnetic head that faces a recording surface of the magnetic disk and flies over the recording surface to write/read information to/from the magnetic disk. It is desirable that a flying height or an interval between the magnetic head and the recording surface is lower and lower because the recording density of the magnetic disk can be increased.

Two methods are known as a driving method for driving the hard disk drive. One is a CSS (Contact Start and Stop) method and the other is an LUL (Load/Unload) method. Because the LUL method permits a reduction of the interval between the magnetic head and the recording surface in comparison with the CSS method, the former enables an increase of the recording density in comparison with the CSS method.

On the other hand, the recording surface of the magnetic disk must be flat and smooth to stabilize a flight of the magnetic head. That is, the magnetic disk must have a substrate that has a flat and smooth surface. As the substrate, attention has been directed to a glass substrate for the magnetic disk because its main surface can be made very flat and very smooth.

The main surface of the glass substrate is polished by a soft polisher to even or smooth them. However, polishing by the use of the soft polisher causes a surface down or a surface rise to occur at an outer edge portion and/or an inner edge portion of the glass substrate. In the LUL method, the magnetic head stays at the outside in a radial direction of the magnetic disk when the magnetic disk is not driven. When the magnetic disk is driven, the magnetic head moves toward the center of the magnetic disk to write/read information to/from the magnetic disk and faces the recording surface of the magnetic disk. Accordingly, the surface down and/or the surface rise at the outer edge portion make the flight of the magnetic head unstable. In the worst case, the magnetic head clashes with the surface of the magnetic disk. In addition, the down and/or the rise limits the recording area of the magnetic disk. This is because an extent of the recording area depends on a flat area of the main surface of the glass substrate.

To solve the above-mentioned problems, several proposals have already been made. For example, a technique for reducing the surface down and the surface rise is disclosed in Japanese Unexamined Patent Publication (JP-A) No. H05-89459. The technique provides appropriate polishing conditions (i.e. polishing pressure and polishing time). Moreover, another technique for stabilizing the flight of the magnetic head is disclosed in Japanese Unexamined Patent Publication (JP-A) No. H05-290365. The technique provides an appropriate radius of curvature at the outer edge portion of the glass substrate.

By the way, the glass substrate is often subjected to chemical reinforcement or treatment used by chemical solution after the polishing process to improve mechanical strength and durability. Such a glass substrate will be called a chemical reinforced glass substrate hereinafter. The chemical reinforcement partially replaces specific ions included in the surface of the glass substrate with other ions larger than the specific ions in ionic radii.

According to the inventors' experimental studies, it has been found out that the chemical reinforced glass substrate can not accomplish a stable flight of a magnetic head due to head crashes and the like and therefore makes it impossible to widen a recording area of the magnetic recording medium manufactured from the chemical reinforced glass substrate.

SUMMARY OF THE INVENTION

It is therefore an object of this invention to provide a chemical reinforced glass substrate which is subjected to chemical reinforcement and which has desirable edge shapes or profiles at outer and inner edges.

It is another object of this invention to provide a chemical reinforced glass substrate of the type described having a high mechanical strength and a flat and smooth surface.

It is still another object of this invention to provide a chemical reinforced glass substrate which can widen a recording area formed on its main surface.

It is further still another object of this invention to provide a chemical reinforced glass substrate used for an information recording medium which can be properly clamped by a clamp for an information recording apparatus.

It is yet another object of this invention to provide a chemical reinforced glass substrate used for an information recording medium which enables a writing/reading head to fly stably over its recording surface.

The ski-jump portions at the outer edge portion of the glass substrate make the flight of the magnetic head unstable and limit the recording area. In addition, it is unavoidable to enlarge the interval between the magnetic head and the recording surface of the magnetic disk because the ski-jump portions at the outer edge portion might bring about the head clashes with the magnetic disk.

On the other hand, the ski-jump portions at the inner edge portion of the glass substrate inclines the magnetic disk against a clamp for clamping the magnetic disk. There is a case where the ski-jump portions at the inner edge portion distort or destroy the magnetic disk when it is clamped by the clamp.

Herein, description will be made about principles of this invention for a better understanding of this invention. Heretofore, a chemical reinforced glass substrate is rarely used for manufacturing a magnetic recording medium or has not been investigated about characteristics of the chemical reinforced glass substrate. According to the inventors' experimental studies, it has been found out that the magnetic recording medium which includes a chemical reinforced glass substrate can not accomplish a stable flight of a magnetic head and often causes head crashes to occur during read/write operation. As a result, it is difficult to accomplish a low flight operation of the magnetic head and to expand a recording area of the magnetic recording medium.

Further inventors' research has revealed that the glass substrate is undesirably deformed at inner and outer edge portions of a main surface when the glass substrate is subjected to chemical reinforcement. It has been also found out that deformed portions appear in the form of projections or recesses at the inner and the outer edge portions. In any event, such projections and recesses provide inner and/or outer edge profiles and will be referred to as ski-jump portions and roll-off portions, respectively. The ski-jump portions at the outer edge portion of the glass substrate make the flight of the magnetic head unstable and limit the recording area. In addition, it is unavoidable to enlarge the interval between the magnetic head and the recording surface of the magnetic disk because the ski-jump portions at the outer edge portion might bring about the head clashes with the magnetic disk.

On the other hand, the ski-jump portions at the inner edge portion of the glass substrate inclines the magnetic disk against a clamp for clamping the magnetic disk. This means that the ski-jump portions at the inner edge portion distort or destroy the magnetic disk when it is clamped by a clamp.

The ski-jump portions at the outer edge portion of the glass substrate make the flight of the magnetic head unstable and limit the recording area. In addition, it is unavoidable to enlarge the interval between the magnetic head and the recording surface of the magnetic disk because the ski-jump portions at the outer edge portion might bring about the head clashes with the magnetic disk.

According to a first aspect of this invention, a method is for use in manufacturing a glass substrate for an information recording medium, the glass substrate having an edge portion adjacent to an outer and/or an inner peripheral side end. The method comprises the steps of previously finding a relationship between chemical reinforcement conditions and that profile variation at the edge portion of the glass substrate which results from chemical reinforcement and performing the chemical reinforcement of the glass substrate on the basis of the relationship to obtain a chemically reinforced glass substrate.

As mentioned before, consideration is previously made about the relationship between the profile variation caused by the chemical reinforcement and the chemical reinforcement conditions. The profile variation may occur, for example, on the edge portion adjacent to the outer peripheral side end and may appear in a thickness direction. In this event, the profile variation may be represented by a variable component in the thickness direction. At any rate, the chemical reinforcement is performed on the basis of the relationship previously detected or found and, as a result, the profile variation on the edge portion adjacent to the outer peripheral side end can be controlled by the chemical reinforcement condition. This applies to the edge portion adjacent to the inner peripheral side end.

The chemical reinforcement may be performed, for example, by a first method of chemically reinforcing a glass substrate by using ion exchange and by a second method of chemically reinforcing the glass substrate by using a de-alkali process. Specifically, the first method realizes the chemical reinforcement of the glass substrate by exchanging ions included in a surface layer of the glass substrate for ions which are included in a chemical reinforcement solution and which have diameters greater than the ions of the surface layer. With this method, expansion takes place in an in-plane direction of the glass substrate and a profile variation component on the main surface is represented by a positive value. Such a positive value of the profile variation component brings about a surface rise area.

On the other hand, the second method which uses the de-alkali process shrinks the glass substrate in the in-plane direction and the profile variation component is represented by a negative value. This brings about a surface down area. In addition, it is confirmed that the profile variation component of the edge portion adjacent to the inner peripheral side end is smaller than that of the outer peripheral side end by 10%–20%.

According to a second aspect of this invention, a method is for use in manufacturing a glass substrate for an information recording medium. The glass substrate has an edge portion adjacent to an outer and/or an inner peripheral side end. The method comprises the steps of previously finding a relationship between chemical reinforcement conditions and that profile variation at the edge portion of the glass substrate which results from chemical reinforcement, deciding a profile on the edge portion by predicting the profile variation of the edge portion to obtain, as a glass substrate prior to chemical reinforcement, a glass substrate prior to chemical reinforcement which has a decided profile and which is not subjected to the chemical reinforcement, and performing the chemical reinforcement of the glass substrate prior to chemical reinforcement to obtain the glass substrate which has a desired profile at the edge portion.

In addition to the merits mentioned in conjunction with the first aspect, the second aspect of this invention predicts the profile variation components caused by the chemical reinforcement and uses the glass substrate prior to chemical reinforcement that can cancel them. With this method, it is possible to strictly and precisely control an outer peripheral contour of the glass substrate subjected to the chemical reinforcement. This applies to an inner peripheral contour of the glass substrate.

According to a third aspect of this invention, the chemical reinforcement performing step is performed on conditions such that the profile variation on the edge portion becomes small. For example, the chemical reinforcement is carried out so that the profile variation becomes small on the outer peripheral side end. In this case, it is possible to suppress, on the outer peripheral side end, the profile variation which might occur due to the chemical reinforcement, if the glass substrate prior to chemical reinforcement is flat on the outer peripheral side end.

Alternatively, even when use is made of the glass substrate prior to chemical reinforcement which can cancel the profile variation, as mentioned In the second aspect, a profile variation extremely becomes small between the glass substrate prior to chemical reinforcement and the glass substrate. This means that the outer edge profile can readily be controlled as compared with a large profile variation and stable processing can be executed with the profile variation kept small. These apply to the inner peripheral side end of the glass substrate.

According to a fourth aspect of this invention, the chemical reinforcement performing step is performed under the chemical reinforcement condition such that a compressive stress layer formed on a surface layer of the glass substrate by the chemical reinforcement reaches to a depth between 3 and 100 $\mu$m and has a compressive stress of 1–15 kg/mm$^2$ and that a tensile stress caused by the chemical reinforcement within the glass substrate is not larger than 4.5 kg/mm$^2$.

As mentioned before, the compressive stress layer at first reaches to the depth between 3 and 100 $\mu$m. This makes it possible to keep desirable mechanical strength of the glass substrate and to reduce the profile variation component on the outer peripheral side end when the chemical reinforcement is performed.

When the depth of the compressive stress layer is thinner than 3 μm, the mechanical strength becomes undesirably weak in durability and against breakage. When the depth of the compressive stress layer exceeds 100 μm, the profile variation component becomes large when the chemical reinforcement is performed. Preferably, the depth of the falls within a range between 40 and 80 μm and more preferably, within a range between 50 and 70 μm.

Second, the compressive stress caused in the surface layer of the glass substrate by the chemical reinforcement is selected between 1 and 15 kg/mm$^2$ while the tensile stress caused within the glass substrate is not greater than 4.5 kg/mm$^2$. This serves to improve the strength of the glass substrate and the durability against breakage based on aging. The compressive stress less than 1 kg/mm$^2$ undesirably weakens the strength of the glass substrate (deterioration of the durability against defects and the characteristics withstanding breakage) while the compressive stress over 15 kg/mm$^2$ enlarges the profile variation components and makes it difficult to control the outer edge profile.

The tensile stress over 4.5 kg/mm$^2$ also enlarges the profile variation components and make the control of the outer edge profile difficult At any rate, the above-mentioned merits are more excellent by setting the depth of the compressive stress layer, the compressive stress, and the tensile stress into optimum values. These are true of the inner peripheral side end.

According to a fifth aspect of this invention, the chemical reinforcement condition defines a processing temperature and a processing time during the chemical reinforcement. By rendering the processing temperature and the processing time of the chemical reinforcement condition into predetermined ranges, it is possible to reduce the profile variation components which appear on the outer and/or the inner peripheral side ends during the chemical reinforcement processing.

In addition to the processing temperature and time, the chemical reinforcement condition may be specified by a species of fused salts and a mixing ratio of the fused salts. However, the processing temperature and time can be readily adjusted in comparison with the species and the mixing ratio of the fused salts. Accordingly, controlling the processing temperature and time is very effective on massproduction and in workability.

According to a sixth aspect of this invention, it is preferable that the processing temperature and the processing time fall with a range between 280° C. and 400° C. and a duration between 0.5 and 5 hours, respectively. If the processing temperature is lower than 280° C., the processing temperature is undesirably lower than a melting point of the fused salt or salts. On the other hand, the processing temperature higher than 400° C. undesirably shortens the processing time and gives rise to a reduction of workability. The processing time shorter than 0.5 hour becomes worse in workability while the processing time over 5 hours undesirably worsen productivity.

Preferably, the processing temperature and the processing time may fall within ranges between 340 and 360° C. and between 1 and 4 hours, respectively, so as to lower the profile variation components on the outer and/or the inner peripheral side ends of the chemically reinforced glass substrate, although they can not be uniquely determined because of depending upon glass compositions of the glass substrate, compositions of the chemical reinforcement solution, and so on.

According to a seventh aspect of this invention, the glass substrate prior to chemical reinforcement has a main surface chamfered and polished together with the edge portion adjacent to the outer and/or the inner peripheral side end. In addition, the previously finding step previously finds or predicts, as the relationship, a relationship between a polishing condition of the main surface and an edge profile obtained on the basis of the polishing condition. Moreover, the deciding step obtains the glass substrate prior to chemical reinforcement by controlling the polishing condition of the main surface on the basis of the above-mentioned relationship between the polishing condition and the edge profile. Specifically, the glass substrate prior to chemical reinforcement has the main surface chamfered along the outer and/or the inner peripheral side ends each adjacent to the edge portion. Prediction is made about the relationship between the polishing condition of polishing the main surface of the glass substrate subjected to a chamfering process and the profile of the edge portion adjacent to the outer and/or the inner peripheral side end. It is posssible to obtain the glass substrate prior to the chemical reinforcement, (may be called an unreinforced or a provisional glass substrate), which has desired outer and/or inner edge profiles by controlling the polishing condition of the main surface on the basis of the above-mentioned relationship.

According to an eighth aspect of this invention, the polishing condition is determined such that the edge portion is polished to be put into a surface down state lowered relative to the main surface 2 of the glass substrate 1, as Illustrated in FIG. 1. Such a polishing condition of rendering the main surface 2 into the surface down state makes it possible to simply and precisely obtain the provisional glass substrate which has the outer edge profile removed by or cancelled by a profile variation caused by the chemical reinforcement. This is true of the inner peripheral side end of the provisional glass substrate.

According to a ninth aspect of this invention, the polishing condition determined for the surface down state is defined such that use is made about a soft polisher of a hardness between 60 and 80 (Askers-C) and a surface pressure to the glass substrate is kept at a range between 40 and 150 kg/cm$^2$ during polishing. The above-mentioned polishing condition makes it possible to readily and precisely attain the glass substrate prior to the chemical reinforcement, which stably keeps the surface down state and to readily control the outer edge profile. In addition, it has been found out that the outer edge profile of the edge portion tends to be rendered into the surface down state as the polisher or a polishing pad is hardened with the other conditions kept intact. The outer edge profile is liable to become the surface rise state as the polishing pressure becomes high while the outer edge profile is rendered into the surface down state as the polishing rotation speed becomes high.

The outer edge profile is varied in dependency upon polishing conditions determined by a structure, a size, and an amount of abrasive materials of a polishing machine. However, controlling the outer edge profile by the hardness of the polisher has a good controllability and is readily executed over a wide range. Under the circumstances, it is preferable that the outer edge profile may be mainly controlled by the hardness of the polisher and subordinately controlled by the polishing pressure and the polishing speed.

According to a tenth aspect of this invention, a glass substrate is subjected to chemical reinforcement and is for use in an information recording medium. The glass substrate chemically reinforced has a main surface and an edge portion which is adjacent to an outer and/or an inner peripheral side end and which is contiguous to the main surface. The edge portion of the glass substrate Which is chemically reinforced has a predetermined region defined by a profile which falls within ±0.35 μm in relation to a flat portion of the main surface determined as a reference surface (zero). With this structure, it is possible to make a magnetic head stably float and run without any head crashes with a low height left and to widen a recording area. At any rate, high density recording and reproducing can be achieved. This means that the glass substrate after the chemical reinforcement is kept flat in the outer edge profile to the exent that no problem takes place in connection with the extension of the recording area and the high density recording and reproducing. This is very effective in a magnetic recording medium of a LUL type.

In the meanwhile, the predetermined region adjacent to the outer peripheral side end may be optionally determined along the outer peripheral side end. However, it is preferable that the predetermined region may be defined by a region which is largely deviated from a reference surface which is determined by a flat portion of the main surface and which is roughened in flatness.

Specifically, it is possible to define, as the predetermined region, a region between an outer periphery of a recording area (an area of the main surface usually keeping flatness) on the main surface and an outermost periphery of a glide region determined on the main surface. Alternatively, the predetermined region may be determined by a region from a side end wall of the glass substrate to an inside of the outer periphery of the recording area.

Herein, it is to be noted that the recording area is generally included within the glide region but may be identical with the glide region.

At any rate, It is preferable that the outer edge profile falls within a range of ±0.20 μm (namely, between −0.20 μm and +0.20 μm) and more preferably, a range of ±0.10 μm (−0.10 μm and +0.10 μm). This also applies to the inner peripheral side end.

According to an eleventh aspect of this invention, the glass substrate is subjected to chemical reinforcement and defined as a glass substrate after chemical reinforcement. The main surface of the glass substrate after chemical reinforcement has a glide area which includes a recording area located inside of the glide area. The glide area has a glide outer periphery while the recording area has a recording area outer periphery inside the glide outer periphery and a flat area. The edge profile chemically reinforced has, within an area extended from the glide outer periphery to an inside of the recording area, a ski-jumped point which is the highest point with respect to a reference surface (zero) defined by the flat area and which has a ski-jump value not greater than ±0.35 μm at the ski-jump point. In addition, the edge profile also has, at a roll-off point defined by a position of the glide outer periphery, a roll-off value not greater than ±0.35 μm with respect to the reference surface.

As mentioned above, the ski-jump point and the roll-off point are defined in the area which is extended from the glide outer periphery to an inside of the recording area. This means that it is possible to render the ski-jump value and the roll-off value into less than +0.35 μm and more than −0.35 μm, respectively, with respect to the reference surface. The edge profile which has the above-mentioned ski-jump value and roll-off value can attain the merits mentioned with reference to the tenth aspect before. In addition, it Is possible to readily manage products by executing numerical control in consideration of the ski-jump point and the roll-off point.

Specifically, the ski-jump value represents a value of the ski-jump point which is the highest point on the edge profile, with respect to the reference to the flat surface of the glass substrate while the roll-off value represents a value of the roll-off point determined on a border line drawn at a position of the glide outer periphery, as mentioned before. The roll-off value is also decided with respect to the reference surface.

Both the ski-jump value and the roll-off value are measured in the following manner.

As shown in FIG. 2, consideration is made about a section of the glass substrate cut by a plane which is perpendicular to the main surface of the glass substrate and which passes through a center of the glass substrate of a disk shape. Within the section, two reference points are determined within the recording area of the main surface on an outline of the recording area and are successively named R1 and R2 from the order near to the center of the glass substrate. In addition, an additional point R3 is determined on a line extended from the recording area outer periphery in an outer direction and is remote from the recording area outer periphery by a predetermined distance. The additional point R3 defines a position of the glide outer periphery of the glide area.

Next, the reference points R1 and R2 are connected to each other by a line which is extended outwards of the glass substrate. The extended line is drawn by a broken line in FIG. 2. Within an area between R2 and R3, measurement is made about a distance between the line R1R2 (or the extended line) and each point set on the outline of the glass substrate. The ski-jump point (represented by S) on the outline of the glass substrate is defined by a highest point at which the distance is the highest in a positive direction. The distance s at the ski-jump point is the ski-jump value.

On the other hand, the roll-off point is defined by a point R which corresponds to R3 and which is placed on the outline of the glass substrate while a distance r between point R and the straight line R1R2 (or the extened line) is representative of the roll-off value.

As shown in FIG. 3, it happens that the ski-jump value s slightly takes a negative value. In this case, the ski-jump specifies the surface down state. As shown in FIG. 4, the roll-off value r also often takes a positive value, which specifies a surface rise state of the glass substrate. Moreover, the ski-jump value s may become equal to the roll-off value r, as shown in FIG. 4.

The reference points R1 and R2 and the point R3 may be optionally selected with reference to a size of the glass substrate. For example, when the glass substrate has an outside diameter of 2.5 inches, 3.0 inches, and 3.5 inches, the point R3 may be determined at a position which is placed at 1 mm from the outer peripheral side end on an inside of the glass substrate. In the case of the glass substrate of 2.5 inches (65 mm in diameter), the reference points R1 and R2 and the roll-off point R3 may be determined, for example, at the positions of 23 mm, 27 mm, and 32.5 mm from the center of the glass substrate, respectively. The roll-off point R3 in the above-mentioned example is determined on the outer peripheral side end.

When the ski-jump value exceeds the range of ±0.35 μm, the magnetic disk can not accomplish stable floating and gives rise to head crashes. This make it difficult to install the magnetic recording medium within a magnetic disk drive.

The roll-off value over the range of ±0.35 μm also deteriorates floating stability of the magnetic head and gives rise to head crashes.

Preferably, each of the ski-jump value and the roll-off value falls within a range of ±20 μm and more preferably, within a range of ±0.10 μm.

According to a twelfth aspect of this invention, the glass substrate after chemical reinforcement has a compressive stress layer within a surface layer which is caused by the chemical reinforcement and which has a depth between 3 and 100 $\mu$m and a compressive stress of 1–15 kg/mm$^2$, Moreover, the glass substrate after chemical reinforcement also has a tensile stress not greater than 4.5 kg/mm$^2$ within an inside of the glass substrate.

The depth of the compressive stress layer between 3 and 100 $\mu$m makes it possible to manufacture an information recording medium glass substrate which has preferable mechanical strength. The depth less than 3 $\mu$m weakens the mechanical strength of the glass substrate (durability against defects and characteristic withstanding breakage). When the depth of the compressive stress layer exceeds 100 $\mu$m, the profile variation component becomes large when the chemical reinforcement is performed. Preferably, the depth of the falls within a range between 40 and 80 $\mu$m and more preferably, within a range between 50 and 70 $\mu$m.

Second, the compressive stress caused in the surface layer of the glass substrate by the chemical reinforcement is selected between 1 and 15 kg/mm$^2$ while the tensile stress caused within the glass substrate is not greater than 4.5 kg/mm$^2$. This serves to improve the strength of the glass substrate and the durability against breakage based on aging. The compressive stress less than 1 kg/mm$^2$ undesirably weakens the strength of the glass substrate (deterioration of the durability against defects and the characteristics withstanding breakage) while the compressive stress over 15 kg/mm$^2$ enlarges the profile variation components and makes it difficult to control the outer edge profile.

The tensile stress over 4.5 kg/mm$^2$ also enlarges the profile variation components and make the control of the outer edge profile difficult At any rate, the above-mentioned merits are more excellent by setting the depth of the compressive stress layer, the compressive stress, and the tensile stress into optimum values. These are true of the inner peripheral side end.

According to a thirteenth aspect of this invention, a method of manufacturing an information recording medium from the glass substrate comprises the step of depositing a recording layer on the main surface of the glass substrate. The information recording medium thus manufactured has the glass substrate flat on the outer edge profile and a wide recording area. In such an information recording medium, the glass substrate has a flat inner edge profile also and can avoid breakage. In any event, the information recording medium can be appropriately mounted onto a magnetic memory device.

According to a fourteenth aspect of this invention, an information recording medium manufactured from the glass substrate comprises a magnetic layer over the main surface. The information recording medium has a high recording density because the glass substrate has a flat outer edge profile and can widen a recording area. The glass substrate which has the flat inner edge profile can avoid breakage. In any event, the information recording medium can be appropriately mounted onto a magnetic memory device.

According to a fifteenth aspect of this invention, the information recording medium is available for a magnetic recording medium of a LUL drive type which can realize an extremely low floating operation of the magnetic head. Therefore, this invention is very effective when it is applied to the LUL drive type magnetic recording medium.

BRIEF DESCRIPTION OF THE DRAWING

FIG. 7 is a table shows measured results for finding reinforcement relationships with regard to 3.5 inch glass substrates;

FIG. 8 is a table shows measured results for finding reinforcement relationships with regard to 2.5 inch glass substrates;

DESCRIPTION OF THE PREFERRED EMBODIMENT

Figure 5A:
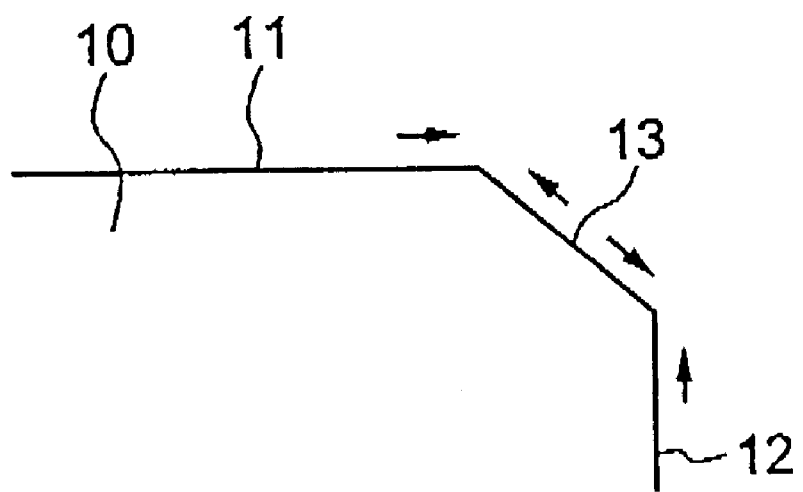
FIG. 5A is a sectional view of an edge profile of a glass substrate prior to a chemical treatment.
Figure 5B:
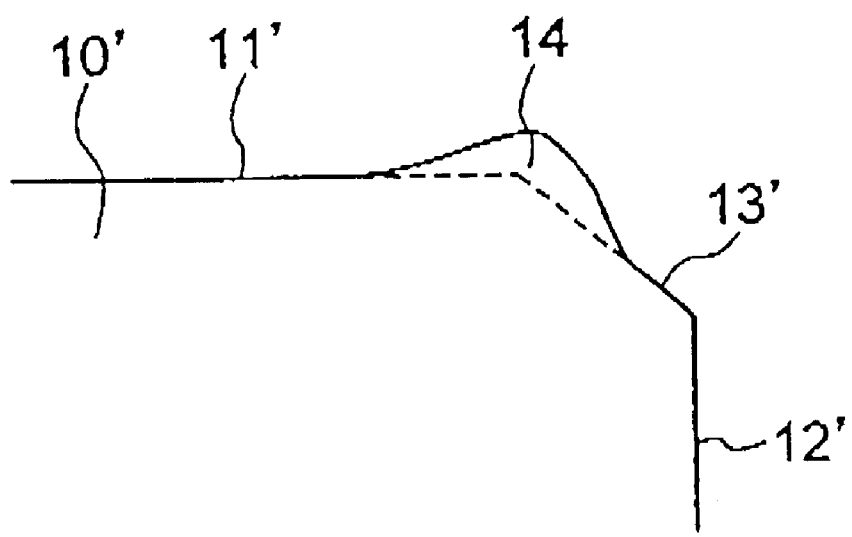
FIG. 5B is a sectional view of an edge profile of a chemical reinforced glass substrate after the chemical treatment.

Referring to FIGS. 5A and 5B, description will be at first directed to a glass substrate and a chemical reinforced glass substrate, respectively, for a better understanding of this invention.

FIG. 5A shows an outer edge portion of a glass substrate 10 prior to chemical reinforcement. The glass substrate 10 prior to chemical reinforcement may be simply called a glass substrate. The illustrated edge portion is assumed to have an Ideal edge profile or shape. The glass substrate 10 has a main surface 11, an outer peripheral surface 12, and a chamfer 13 between the main surface 11 and the side surface 12.

When the glass substrate 10 is immersed in a chemical reinforcement solution (not shown), specific ions in the surfaces of the glass substrate 10 are replaced with other ions which are larger than the specific ions in ionic radii. As a result, each surface of the glass substrate 10 slightly expands as shown by arrows in FIG. 5A. Consequently, the glass substrate 10 is treated or processed into a chemical reinforced glass substrate 10' as illustrated in FIG. 5B.

As shown In FIG. 5B, it has been confirmed that a swell or a bump 14 is formed between the main surface 11' and the chamfer 13'. When the chemical reinforced glass substrate 10' is used for a magnetic disk of a hard disk drive, a magnetic head of the hard disk drive flies over the bump 14. As a result, the flight of the magnetic head becomes unstable. Moreover, it is hard to fly the magnetic head at a low height because the magnetic head clashes with the magnetic disk. In addition, the ski-jump portion 14 limits a flat area of the main surface 11'. The flat area is used for a recording area of the magnetic disk.

Additionally, though another bump portion (not shown) is formed between the outer peripheral surface 12' and the chamfer 13', it is unrelated to the flight of the magnetic head and the recording area of the magnetic disk. Therefore, explanation of the bump portion between the outer peripheral surface 12' and the chamfer 13' will be omitted hereinafter.

According to Applicants' experimental studies of the chemical reinforcement for the glass substrate, it has been found out that the bump portion of the outer edge portion of the chemical reinforced glass substrate could be controlled by changing chemical reinforcement conditions. In addition, the applicants have found that changing polishing conditions could control the outer edge profile of the glass substrate having a chamfer. Taking this into consideration, the applicants have completed a method according to this invention related to the chemical reinforced glass substrate on the basis of the above-mentioned facts.

Furthermore, the applicants have found out that the flight of the magnetic head became stable and could becomes lower without dash with the magnetic disk including the chemical reinforced glass substrate when the bump portion is appropriately controlled within a desirable size. Then the applicants have completed another method according to this invention related to the magnetic disk having the chemical reinforced glass substrate on the basis of the findings.

Figure 6:
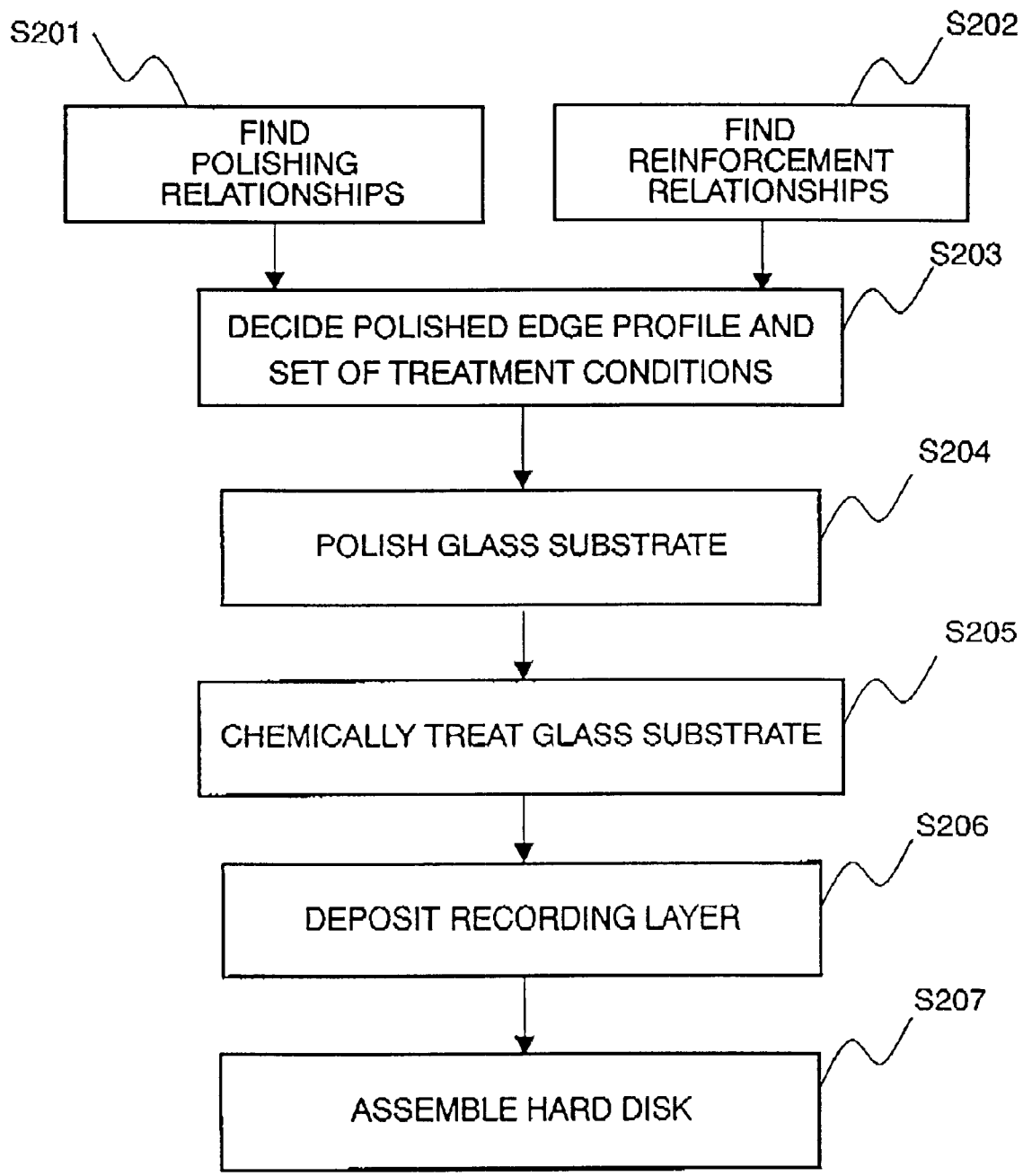
FIG. 6 is a flow chart of a method of manufacturing a chemical reinforced glass substrate according to a preferred embodiment of this invention.

Referring to FIG. 6, the description will proceed to a method of manufacturing a chemical reinforced glass substrate according to a preferred embodiment of this invention.

At the step S201 of FIG. 6, a plurality of glass substrates are provided to be polished under various polishing conditions. Each of the glass substrates has a disk shape and a center hole. Namely, each of the glass substrates has an outer edge portion and an inner edge portion. Hereinafter, though the description is mainly made about the outer edge portion, the inner edge portion can be also processed in a similar manner. Generally, the glass substrate has a main surface, an outer peripheral surface, and a chamfer between the main surface and outer peripheral surface. The main surfaces of the glass substrates are polished under the various polishing conditions to be changed to polished glass substrates with polished edge profiles (i.e. smooth or undeformed edge profiles). Polishing relationships between the polishing conditions and the polished edge profiles are found prior to chemical reinforcement.

At the step S202, the polished glass substrates (or other polished glass substrates) are provided to be chemically reinforced under various reinforcement conditions. The polished glass substrates are chemically reinforced under the various reinforcement conditions to be chemically reinforced to obtain chemical reinforced glass substrates having reinforced edge profiles (i.e. deformed edge profiles). Treatment relationships between the treatment conditions and the treated edge profiles are found.

At the step S203, to obtain a chemical reinforced glass substrate having a desirable edge profile, a combination of one of the polished edge profiles and one set of reinforcement conditions is decided or selected on the basis of the reinforcement relationships found at the step S202.

At the step S204, another glass substrate is provided and polished on the basis of the polishing relationships found at the step S201. As a result, a polished glass substrate is obtained which has the decided edge profile decided at the step S203.

At the step 8205, the polished glass substrate is chemically reinforced under the condition of the set decided at the step S203. Ideally, as a result, the polished glass substrate is rendered into the chemical reinforced glass substrate having the desirable edge profile.

Thus, the chemical reinforced glass substrate having the desirable edge profile is obtained. For mass production, the steps S203–S205 are repeated or the steps 204 and 205 may be repeated once the desirable edge profile Is determined at the step 203.

Then, the chemical reinforced glass substrate is sent to a next process. At the step S206, at least a recording layer is deposited on the main surface of the chemical reinforced glass substrate to form a magnetic disk. The recording layer including a magnetic layer.

Finally, at the step S207, the magnetic disk is assembled into a hard disk drive.

Figure 1:
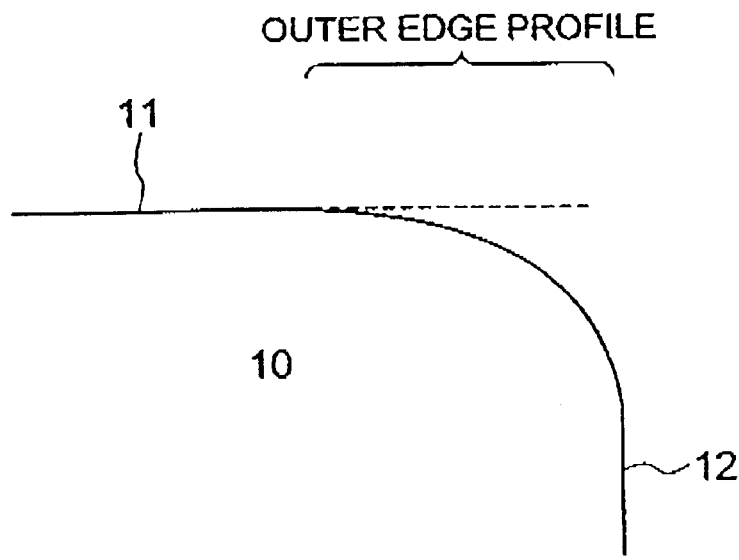
FIG. 1 is a sectional view for use in describing a polished glass substrate which has an outer edge profile put in a surface down state.
Figure 2:
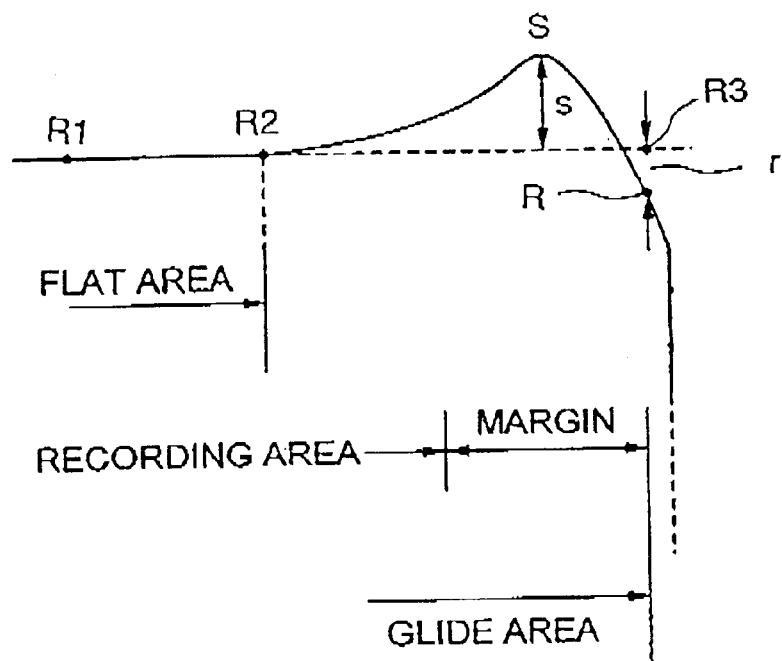
FIG. 2 is a sectional view for use in describing an edge profile in detail.

According to the above-mentioned method, it is readily understood that deformed portions, namely, the bump 14 (FIG. 2) caused by the chemical reinforcement at the edge portions can be controlled by changing the reinforcement conditions. This is because the reinforcement relationships between the deformed portions (especially, in a direction of thickness) and the reinforcement conditions are previously found. The deformed portions have the edge profiles in the direction of thickness.

Herein, the chemical reinforcement is for strengthening or reinforcing the glass substrate. As already described before, the chemical reinforcement enhances mechanical strength and durability of the glass substrate. As the chemical reinforcement, an ion exchange method and a de-alkalization method are known. In the ion exchange method, specific ions included in surfaces of the glass substrate are replaced with other ions in a chemical reinforcement solution. Because the other ions are larger than the specific ions in ionic radii, the surfaces of the glass substrate expand. As a result, the edge portion tends to swell.

On the other hand, in the de-alkalization method, alkali ions are removed from the surfaces of the glass substrate. Consequently, the edge portion tends to become small. The deformation at the inner edge portion is almost equal to 80–90 percent of that at the outer edge portion.

Moreover, according to the method, the reinforced edge profile can be strictly controlled by selecting the polished glass substrate. This is because the deformation caused by the chemical reinforcement can be adjusted by polishing the glass substrate on the basis of the reinforcement relationships and polishing relationships.

In addition, according to the above mentioned method, a desirable polished edge profile can be easily and precisely obtained by selecting the polishing conditions. This is because the polishing relationships are previously found and detected.

Figure 3:
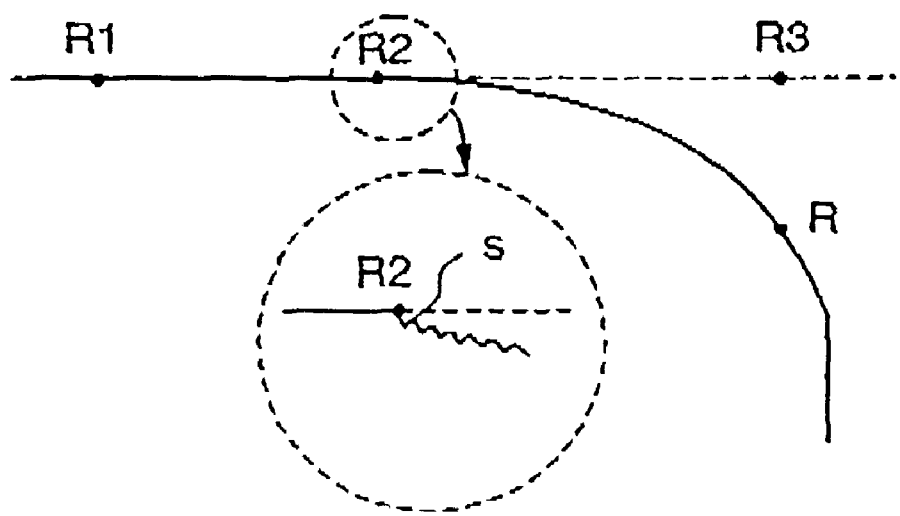
FIG. 3 is a sectional view for use in exemplifying a ski-jump and a roll-off at an edge portion of a glass substrate.

The desirable polished edge profile is, for example, as shown in FIG. 3. That is, the outer edge portion has a surface down without a surface rise. Such an edge profile is suitable for offsetting deformation caused by the chemical treatment. The edge profile shown in FIG. 3 is easily and precisely obtained by using soft polisher having hardness of 60–80 (Askers-C) with a surface pressure 40–150 g/cm$^2$ at the main surface of the glass substrate. When the hardness of the polisher becomes hard and other polishing conditions are fixed, the edge portion becomes lower. Similarly, when a polishing rotation speed becomes fast with other polishing conditions kept constant, the edge portion becomes lower. When the polishing pressure becomes large, the edge portion becomes higher.

The hardness of the polisher can readily changed by exchanging the polisher for another one. The hardness of the polisher can be finely changed by the exchange. The control of the polishing by the exchange of the hardness of the polisher can be precisely performed in a wide range.

On the other hand, when the reinforcement conditions are selected so that the deformation is smaller and the edge profile of the polished glass substrate is flat, the deformation is considerably suppressed. If the deformation is small, the edge profile is easy to control. Consequently, it is readily possible to manufacture large number of the chemical reinforced glass substrates having even quality.

When a compressive stress layer caused by the chemical treatment has a depth of 3–100 μm, the chemical reinforced glass substrate has necessary strength and the deformation at the outer edge portion is suppressed. When the compressive stress layer has the depth smaller than 3 μm, the chemical reinforced glass substrate can not withstand friction and is easily broken. When the compressive stress layer has the depth larger than 100 μm, the deformation is large and hard to control. A desirable depth of the compressive stress layer falls within a range of 40 μm to 80 μm and a more desirable depth falls within a range of 50 μm to 70 μm.

Moreover, when the compressive stress layer has a compressive stress 1–15 kg/mm$^2$ and a tensile stress caused by the compressive stress layer in the glass substrate except for the compressive stress layer is under 4.5 kg/mm$^2$, the glass substrate is improved in the strength and the durability.

When the compressive stress is lower than 1 kg/mm$^2$, the glass substrate cannot withstand friction and is easily broken. When the compressive stress is larger than 15 kg/mm$^2$, the deformation is large and hard to control the edge profile. When the tensile stress is larger than 4.5 kg/mm$^2{}_1$ the deformation is large and hard to control the edge profile.

The depth of the compressive stress layer, the compressive stress, and the tensile stress may be adjusted to improve the strength and the durability of the glass substrate and to simplify the control of the edge profile. For example, it is desirable that the depth of the compressive stress layer is 40–80 μm, the compressive stress is 3–14 kg/mm$^2$, and the tensile stress layer is under 2.5 kg/mm$^2$.

The reinforcement conditions include reinforcement or treatment temperature, reinforcement or treatment time, a combination of fused salts, a mixed ration of the fused salts, and so on. The treatment temperature and the treatment time are easy to change and effective in mass production of the glass substrate. Namely, it is easy to suppress the deformation of the edge portion within a predetermined range by suitably selecting the treatment temperature and the treatment time. For example, the treatment temperature is 280–400° C. and the treatment is 0.5–5 hours. If the treatment temperature is lower than 280° C., it is lower than the fusion points of the fused salts. If the treatment temperature is higher than 400° C., the treatment time must be shortened and must be strictly controlled. On the other hand, when the treatment time is shorter than 0.5 hours, it must be strictly controlled and an operation is hard to be performed. When the treatment time is longer than 5 hours, productivity is decreased. The treatment temperature and the treatment time must be changed according to components of the glass substrate and components of the chemical reinforcement treatment solution. Accordingly, the treatment temperature and the treatment time for suppressing the deformation cannot be generalized. However, an desirable example is cited soon. It is desirable that the treatment temperature is 320–380° C. (more desirably, 340–360° C.) and the treatment time is 14 hours.

Figure 4:
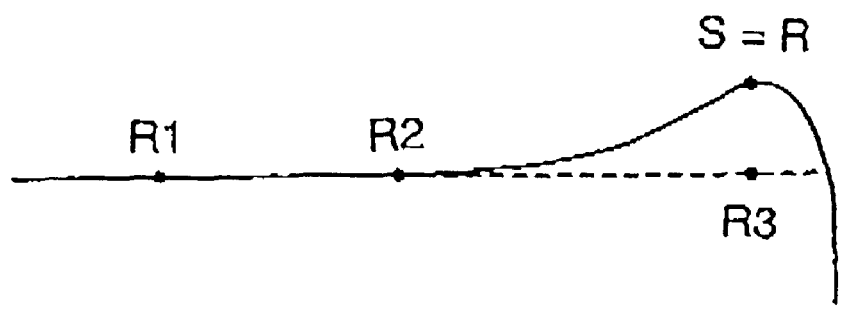
FIG. 4 is a sectional view for use in exemplifying another ski-jump and another roll-off at an edge portion of a glass substrate.

As already described in conjunction with FIG. 4, the deformation on the edge portion can be specified by the edge profile that can be represented by the ski-jump and the roll-off.

Referring FIGS. 7 through 10, description will be made about examples of this invention, taking the above into account.

EXAMPLE 1

In a first example, the reinforcement relationships are measured. The measurement is performed about the chemical reinforcement conditions (i.e. the chemical reinforcement temperature and the chemical reinforcement time), variations on the basis of the deformation (i.e. variations of the outside diameter and the inside diameter), a thickness (or depth) of the compression stress layer, the compressive stress, the tensile stress, and transverse rupture strength.

Glass substrates prior to chemical reinforcement (simply called glass substrates) are prepared for the measurement. Samples 1-1 to 1-7 of FIG. 7 have 3.5 inches (i.e. 95 mm) in diameter while samples 2-1 to 2-8 of FIG. 8 have 2.5 inches (i.e. 65 mm) in diameter. These glass substrates are polished and substantially have flat main surfaces. Under the circumstances, measurement is made about both of the ski-jump value s and the roll-off value r of each glass substrate which are defined in conjunction with FIG. 4 and which are about zero.

The roll-off point R is decided (see FIG. 4) at a position placed inside by 1 mm from the outer peripheral surface while the reference point R2 is decided at a position remote by 5.5 mm from the outer peripheral surface in connection with each glass substrate. In each of the 3.5 inch sample glass substrates, the point R3 is located at a position remote by 46.5 mm from the center and the reference point R2 is located at a position remote by 42 mm from the center.

In each of the 2.5 inch sample glass substrates, the point R3 is located at a position distant by 31.5 mm from the center and the point R2 is located at a position remote by 27 mm from the center.

A height of the outer edge portion is successively measured along the outline of the outer edge portion by a surface roughness measuring apparatus (SURFTEST SV-624 manufactured by Mitutoyo Co.). The height of the outer edge portion of the chemical reinforced glass substrate is different from the that of the glass substrate prior to chemical reinforcement. Herein, the highest point and its value of the edge profile between the points R2 and R3 is defined as the ski-jump point S and the ski-jump value s, respectively, as mentioned before, and the ski-jump value s is determined at every one of the chemical reinforced glass substrates.

The outside and the inside diameters are measured by a micrometer, to obtain a first outside diameter prior to chemical reinforcement and a second outside diameter of the chemical reinforced glass substrate. The first outside diameter is different from the second diameter. Thus, a variation between the first and the second outside diameters is obtained. Similarly, measurement is made about the inside diameters of the glass substrates prior to chemical reinforcement and after chemical reinforcement to obtain first and second inside diameters, respectively. As a result, the first inside diameter is different from the second inside diameter. Thus, a variation between the first and the second inside diameters is obtained.

In the above-mentioned example, a mixture of potassium nitrate (60 wt %) and sodium nitrate (40 wt %) is used as the chemical reinforcement solution.

Results of the measurement are shown in FIGS. 7 and 8.

As easily understood from FIGS. 7 and 8, as the reinforcement temperature becomes high, each variation of the outside diameter, inside diameter, and the ski-jump value s becomes large. Similarly, as the reinforcement time becomes long, each variation of the outside diameter, inside diameter, and the ski-jump value s becomes large. The transverse rupture strength becomes also large as the treatment temperature and/or the treatment time becomes high and/or long.

Taking the above into consideration, it is possible to obtain the desirable edge profile of the chemical reinforced glass substrate in the following manner. Namely, the chemical reinforcement conditions are at first determined within a range that satisfies mechanical and chemical durability required for the glass substrate for the magnetic disk or the magnetic recording medium. Thereafter, a ski-jump value depending upon the chemical reinforcement conditions is predicted in accordance with a correlation between the determined chemical reinforcement conditions mentioned above and a variation of the ski-jump values. Under the circumstances, the edge profile of the glass substrate prior to chemical reinforcement is determined as the desirable edge profile in consideration of both the lapping process and the polishing process. Thus, the edge profile of the chemical reinforced glass substrate can be strictly controlled.

Required transverse rupture strength of the glass substrate for the magnetic disk of 3.5 inches falls within a range between 15 and 20 kgf. All of the samples 1-1 through 1-7 have the transverse rupture strength falling within the above-mentioned range. From this fact, it is concluded that the variation of the outer edge profiles can be reduced or suppressed by performing the chemical reinforcement under the chemical reinforcement conditions that the reinforcement temperature and the time fall within the range between 340 and 360° C. and the range between 1.5 and 2 hours, respectively, and the variation of the ski-jump values is small and falls within a range between 0 and 0.010 μm. More desirable conditions are specified by combinations of the reinforcement temperature of 340° C. and the reinforcement time 1.5–2 hours.

On the other hand, the required transverse rupture strength of the glass substrate for the magnetic disk of 2.5 inches is about 10–15 kgf. in this case, all of the samples 2-1 through 2-8 satisfy the required transverse rupture strength. Then, the desirable conditions which can suppress the variation are combinations of the reinforcement temperature of 340–360° C. and the reinforcement time 0.6–2 hours.

From the above-mentioned results, conclusion may be made about the facts that the preferable chemical reinforcement conditions for satisfying the required mechanical strength with the ski-jump value kept small are that the depth of the compressive stress layer caused by the chemical reinforcement is present between 40 and 80 μm, the compressive stress is between 3 and 14 kg/mm$^2$, and the tensile stress is not greater than 2.5 kg/mm$^2$. The tensile stress is caused by the compression stress layer in the chemical reinforced glass substrate except for the compression stress layer.

EXAMPLE 2

In a second example, the polishing relationships are measured. A plurality of polishers having different hardness is prepared for measuring the roll-off value r. For each of polishers, one hundred of the glass substrates unpolished are provided. Each unpolished glass substrate has a flat surface and 3.5 inches in diameter. In this event, an amount of each polisher and a polishing pressure are kept constant. In each unpolished glass substrate, the point R3 is decided at a position remote by 1 mm from the outer peripheral side surface. Under the circumstances, the roll-off value r at the point R3 is determined or measured which represents an amount of deviation of the outline point R from the reference line or surface.

Figures 9, 10:
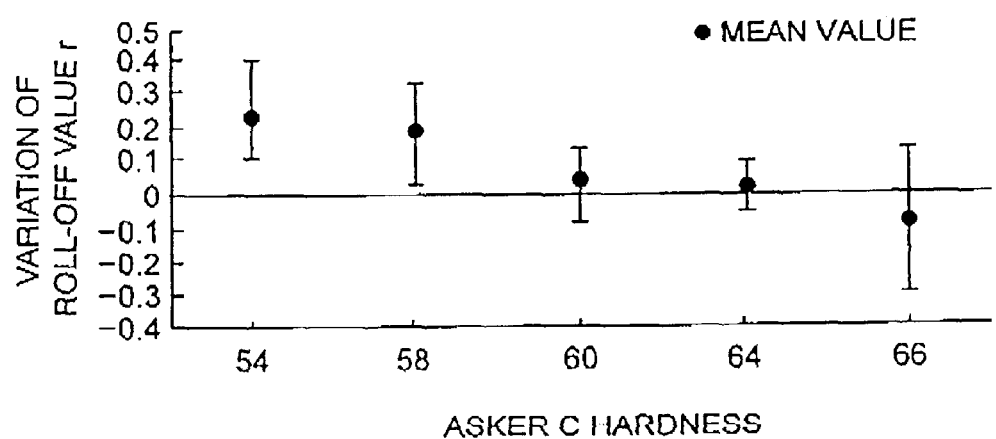
FIG. 9 is a table shows measured results for finding polishing relationships.
FIG. 10 is a graph shows a part of the measured results of FIG. 9.

Results of the measurement are shown in FIGS. 9 and 10. As easily understood from FIGS. 9 and 10, when the hardness is smaller than 60 (Asker-C), the roll-off value r is positive. With an increase of the hardness, the roll-off value r becomes low.

As mentioned before, it is readily understood that the ski-jump value s becomes positive by chemical reinforcement when the glass substrate is subject to the chemical reinforcement. Taking this into account, it is necessary to put the edge profile of the glass substrate prior to the chemical reinforcement (namely, the glass substrate after the polishing process) into the surface down state in relation to the main surface of the above-mentioned glass substrate in order to keep the edge profile of the chemical reinforced glass substrate in a flat or excellent state. Accordingly, the polisher must have the hardness over 60 (Asker-C). Desirable hardness of the polisher is 60–80 (Asker-C). More desirable hardness of the polisher is between 66 and 80 (Asker-C) because the mean value of the roll-off values r is negative.

EXAMPLE 3

In the example 3, a chemical reinforced glass substrate is manufactured and a magnetic disk Is manufactured by the use of the chemical reinforced glass substrate.

(1) Rough Lapping Process

At first, melted glass (e.g. aluminosilicate glass) is pressed by an upper mold, a lower mold, and a body mold to form a glass substrate having 96.0 mm in diameter and 1.8 mm in thickness. The aluminosilicate glass comprises, as main components, silicon dioxide ($SiO_2$: 58–75 wt %), aluminum oxide ($Al_2O_3$: 5–23 wt %), lithium oxide ($Li_2O$: 3–10 wt %), and sodium oxide ($Na_2O$: 4–13 wt %). For example, the aluminosilicate glass includes $SiO_2$ of 63.5 wt%, $Al_2O_3$ of 14.2 wt %, $Li_2O$ of 5.4 wt % $Na_2O$ of 10.4 wt %, $ZrO_2$ (zirconium dioxide) of 6.0 wt %, $Sb_2O_3$ (diantimony trioxide) of 0.4 wt %, and $As_2O_3$ (diarsenic trioxide) of 0.1 wt %.

The glass substrate may be obtained by grinding or cutting a sheet glass with a grinder. The sheet glass is formed by, for example, a down flow method or a float method.

Next, the glass substrate is lapped by a lapping machine. Namely, the glass substrate is mounted on a carrier of the lapping machine. Then, both sides (upper and lower main surfaces) are lapped by the use of abrasive grains having a particle size of #400. The abrasive grains are, for example, aluminum oxide. In this process, the glass substrate is loaded with 100 kg. Thus, the substrate is changed into a roughly lapped glass substrate having profile irregularity of 0–1 μm and surface roughness of 6 μm in Rmax (based on JIS B 0601).

(2) Shaping Process

An opening is formed at the center of the roughly lapped glass substrate by a cylindrical whetstone and an inner peripheral surface is exposed. Moreover, an outer peripheral surface of the roughly lapped glass substrate is ground so that the outside diameter becomes 95 mm. In addition, chamfers are formed between each main surface and the inner peripheral surface and between each main surface and the outer peripheral surface. The inner peripheral surface, the outer peripheral surface, and chamfers have surface roughness 4 μm in Rmax. Thus, the roughly lapped glass substrate is rendered into a shaped glass substrate.

(3) Mirror Finishing Process for Edges

While the shaped glass substrate is rotated, the inner peripheral surface, the outer peripheral surface, and the chamfers are brushed with slurry of cerium dioxide abrasive grains. Thus, mirror finish for the inner peripheral surface, the outer side surface, and the chamfers is completed. The inner peripheral surface has surface roughness of 0.17 μm in Rmax and 0.02 μm In Ra. The chamfers of the inner edge portion have surface roughness of 0.60 μm in Rmax and 0.08 μm in Ra. The outer peripheral surface has the same surface roughness as the inner peripheral surface has. The chamfers of the outer edge portion have surface roughness of 0.77 μm in Rmax and 0.10 μm in Ra. The surface roughness is measured by a measurement apparatus of Tencor P2 (manufactured by KLA-Tenkor Co.)

Then the mirror finished glass substrate are washed with water.

(4) Lapping Process

The mirror finished glass substrate is lapped by the lapping machine with abrasive grains having a particle size of #1000. By this process, the mirror finished glass substrate changes into a smooth lapped glass substrate having flatness of 3 μm and surface roughness of about 2.0 μm in Rmax and 0.2 μm In Ra. The surface roughness is measured by an AFM (interatomic force microscope).

Then, the smooth lapped glass substrate is soaked in neutral detergent liquid and water in order and washed.

(5) Polishing Process

The smooth lapped glass substrate is polished by polishing machine to remove flaws and warps that cannot be removed by the above-mentioned lapping process. This process is performed on the basis of the results of the examples 1 and 2. For example, the ski-jump value s increases by 0.004 μm when the chemical reinforcement treatment is performed at 340° C. for 2 hours. In this case, if the polishing Is performed so that the ski-jump value s is about 0 μm and the roll-off value r is about –0.004 μm, the edge profile becomes almost flat. Namely, the polishing conditions that the ski-jump value s is about 0 μm and the roll-off value r is about –0.004 μm are selected. Additionally, the points 2 and 3 correspond to those of Examples 1 and 2.

The selected polishing conditions are enumerated below.

Polishing Fluid: cerium dioxide (mean particle diameter= 1.0 μm) (free abrasive grains+water), Polisher: Soft Polisher (hardness of 68 (Asker-C)), Load: 200 kg (surface pressure: 66 g/cm), Polishing Time: 80 minutes, Removing thickness: 50 μm, Rotation Speed of Upper Table: 20 rpm, Rotation Speed of Lower Table: 26 rpm, Revolution (orbital motion) Speed of Carrier 3 rpm, and Rotation Speed of Carrier 3 rpm.

After the polishing under the above mentioned conditions is performed, the polished glass substrate is successively soaked in neutral detergent liquid, first pure water (demineralized water), second pure water, first isopropyl alcohol, and second isopropyl alcohol (steam and drying) in order.

The ski-jump value s and the roll-off value r of the polished glass substrate are measured by the surface roughness measuring apparatus (SURFTEST SV-624 manufactured by Mitutoyo Co.). The ski-jump value s is equal to +0.002 μm while the roll-off value r is equal to –0.005 μm. It can be recognized that the edge portion practically has a surface down without a surface rise.

(6) Chemical Reinforcement Treatment Process

The polished glass substrate is heated to 300° C. and soaked in chemical reinforcement solution heated to 340° C. for 2 hours. The chemical reinforcement solution is a mixture of potassium nitrate (60%) and sodium nitrate (40%).

Next, the chemical reinforced glass substrate is soaked in water of 20° C. for 10 minutes to cool it quickly. In this event, the chemical reinforced glass substrate is broken if it has minute cracks on the surfaces. That is, this process enables elimination of a defective article.

Then, the chemical reinforced glass substrate is soaked in sulfuric add having concentration of 10 wt %, neutral detergent liquid, first pure water, second pure water, and isopropyl alcohol in order to wash it The ski-jump value s and the roll-off value r of the chemical reinforced glass substrate are measured. The ski-jump value s and the roll-off value r are equal to +0.002 μm and +0.005, respectively. This means that the surface of the chemical reinforced glass surface between the points R2 and R3 falls within a range of –0.005 μm and +0.005 μm from the reference surface. That is, the chemical reinforced glass surface has a nearly flat surface at the edge portion.

Moreover, the chemical reinforced glass substrate has the compression stress layer of 79.8 μm thick, the compressive stress of 13.8 kg/mm$^2$, and the tensile stress of 2.0 kg/mm$^2$. The values are equal to those of the sample 1-2 of FIG. 7.

Furthermore, the chemical reinforced glass substrate has the surface roughness Ra of 0.51 nm and Rmax of 5.20 nm on the main surface, waviness Wa of 0.43 nm at the main surface, and mircowaviness Wa (Ra) of 0.50 measured at a microscopic area of the edge portion. Additionally, the surface roughness Ra and Rmax are measured by the interatomic force microscope. The waviness Wa is measured by a multifunction disk interferometer (e.g. OPTIFLAT manufactured by PHASE SHIFT TECHNOLOGY Co.). The measurement of the waviness Wa is performed about an area (about 115400 pixels) of 20.3 mm to 45.0 mm remote from the center in a radius direction. The microwaviness Wa (Ra) is measured by a multifunction surface analyzing machine (e.g. MicroXAM manufactured by PHASE SHIFT TECHNOLOGY Co.). The measurement of the waviness Wa (Ra) is performed to a square area (about 250000 pixels) of about 500 μm in length and about 600 μm in width.

The vaviness Wa and the microwaviness Wa (Ra) are provided as follows.

The microwaviness Wa (Ra) and the waviness Wa are calculated by scanning a predetermined area of the substrate surface by the use of white light (wavelength: about 550 nm) and etc., by synthesizing reflection light from the substrate surface with reflection light from a reference surface, and by using interference fringes appearing at a synthesized point.

The microwaviness Wa (Ra) on the micro-area has a waviness period of about 2 μm to 4 mm and is represented by an average of an absolute value of a deviation from a center line to a measured curve. Herein, the center line is defined by a straight line such that, when a parallel straight line is drawn which is parallel to an average line of the measured curve, an area surrounded by the parallel straight line and the measured curve becomes equal to each other on both sides of the parallel straight line. The microwaviness Wa (Ra) and the waviness Wa may be measured by any other light than white light.

A plurality-of measuring points is decided on the measuring curve. Each of the measuring points has a measuring point value. The measuring point value is a distance from a standard straight line which is suitably decided. The microwaviness Wa (Ra) (or waviness Wa) is given by:

$$Wa(Ra)\,(\text{or}\,Wa) = \frac{1}{N}\sum_{i=1}^{N} |Xi - \overline{X}|$$

where N is the number of the measuring points, Xi is the measuring point value at the i-th measuring point, and $\overline{X}$ is the mean of ail of the measuring point values X.

It is preferable that the microwaviness Wa (Ra) and the waviness Wa have the microwaviness period from 2 μm to 4 mm, as mentioned before, and, a waviness period from 300 μm to 5 mm, respectively.

(7) Manufacturing Process for Magnetic Disk

A nickel-aluminum seed layer, a chrome-molybdenum underlayer, a cobalt-chrome-platinum-tantalum magnetic layer, and carbon hydride protective layer are deposited in order on the both sides (upper and lower main surfaces) of the chemical reinforced glass substrate by a sputtering apparatus of an inline type. A perfluoropolyether lubricant layer is formed each carbon hydride protective layer by the use of a dip method. Thus, a magnetic disk is completed.

The magnetic disk is mounted on a hard disk drive of the LUL method. In the hard disk drive, a magnetic head can fly stably without clash with the magnetic disk. Because the surface roughness Ra and Rmax and the waviness Wa and the microwaviness Wa (Ra) are all small, a touch-down-height is preferably not greater than 10 nm. Thus, the recording area can be expanded.

COMPARATIVE EXAMPLE 1

A chemical reinforced glass substrate is manufactured by a manner similar to the example 3. However, the polishing process is performed so that the roll-off value r becomes positive by adjusting especially the outer edge profile. In addition, the chemical treatment process is performed at 380° C. for 4 hours.

Though the chemical reinforced glass substrate has the surface roughness Ra and Rmax that are similar to those of the example 3, the ski-jump value s and the roll-off value r are equal to +0.421 μm and +0.420 μm, respectively. When the chemical reinforced glass substrate is used for a magnetic disk of a hard disk drive, a magnetic head dashes with the magnetic disk.

The chemical reinforced glass substrate has a compression stress layer of 140.8 μm in depth, a compressive stress of 20.5 kg/mm$^2$ in compression stress layer, a tensile stress 27 kg/mm$^2$ in the chemical reinforced glass substrate. These values are equal to those of the samples 1-7 of FIG. 7. Moreover, the chemical reinforced glass substrate has the waviness Wa of 1.85 nm and the microwaviness Wa (Ra) of 0.93 nm.

As understood from comparison of Example 3 with the comparative example 1, it is to be noted that the chemical reinforcement conditions are decided in Example 3 in relation the required mechanical strength and durability and the polishing conditions are decided so as to cancel the deformation caused by the chemical reinforcement. In addition, the chemical reinforced glass substrate is manufactured in Example 3 on the basis of the decided polishing condition and the decided chemical reinforcement conditions. As a result, it is proved that the magnetic head does not clash with the magnetic disk that uses the chemical reinforced glass substrate (Example 3) and that is driven by the hard disk drive adopting the LUL method. However, when the polishing conditions are not considered like in the comparative example, the chemical reinforced glass substrate can not be used for the magnetic disk driven by the LUL method.

Moreover, it is understood from the comparison of the example 3 with the comparative example 1 that the ski-jump value s and the waviness Wa and the microwaviness Wa (Ra) become large when the deformation becomes large (the reinforcement time becomes long and/or reinforcement temperature becomes high).

EXAMPLE 4

A chemical reinforced glass substrate is manufactured by a manner similar to the example 3. However, the polished glass substrate is soaked In hydosilicofluoric acid after the polishing process. The chemical reinforced glass substrate is used for a magnetic disk of a hard disk drive adopting the CSS (contact-start-stop) method.

The chemical reinforced glass substrate has the ski-jump value s and the roll-off value r that are the same as those of the Example 3. The surface roughnesses Rmax and Ra of the chemical reinforced glass substrate are Influenced by the hydosilicofluoric acid and equal to 7.8 nm and 0.83 nm, respectively.

In the hard disk drive, a magnetic head can fly stably without clash with the magnetic disk using the chemical reinforced glass substrate. Moreover, it is possible to widen the recording area by using the chemical reinforced glass substrate according to Example 4.

EXAMPLE 5

A chemical reinforced glass substrate is manufactured by a manner similar to the example 3. Herein, it is to be noted that the polishing conditions are selected so that the ski-jump value s and the roll-off value r become about 0 μm and about −0.035 μm, respectively, by expecting or considering the ski-jump value s and the roll-off value r which are obtained during the chemical reinforcement performed under the chemical reinforcement conditions (380° C. and 4 hours) mentioned in conjunction with Example 1. The chemical reinforcement is performed under the chemical reinforcement conditions (380° C. and 4 hours) after the polishing process is performed under the above-mentioned polishing conditions.

Practically, the polishing process is performed by the use of a polisher having hardness of 80 (Asker-C). The load, the polishing time, and other conditions are appropriately adjusted.

The chemical reinforced glass substrate has the ski-jump value s of +0.03 μm and the roll-off value r of −0.04 μm both of which are worse than those of the example 3. This is because the deformation caused by the chemical reinforcement is too large to be controlled by the polishing.

Though the ski-jump value s and the roll-off value r are worse than those of the example 3, a magnetic head can fly stably without clash with a surface of a magnetic disk using the chemical reinforced glass substrate in a LUL type hard disk drive. In addition, the recording area can be widened in Example 5 also.

Plural chemical reinforced glass substrates were manufactured by the processes of the example 3 and the example 5. It was confirmed that the chemical reinforced glass substrates manufactured by the example 3 had a small variation in the edge profile in comparison with the chemical reinforcement glass substrates according to the example 5 when measurement was made about the edge profile. Consequently, the chemical reinforcement glass substrates according to the example 3 had the edge profiles which were uniform and excellent as compared with the example 5.

While this invention has thus for been described in conjunction with the preferred embodiment thereof, it will readily be possible for those skilled in the art to put this invention into practice in various other manners.

For example, this invention may be applied to not only the outer edge portion but also the inner edge portion.

Moreover, the treatment conditions may include not only the treatment temperature and the treatment time but also the kind of the chemical reinforcement treatment solution. For example, the mixture ratio of the potassium nitrate and sodium nitrate may be changed. Moreover, the potassium nitrate or the sodium nitrate may be used as the chemical reinforcement treatment solution. Furthermore, sodium sulfate ($Na_2SO_4$), potassium sulfate ($K_2SO_4$), sodium bromide (NaBr), potassium bromide (KBr), $KNO_2$, and $NaNO_2$ may be selectively used as the chemical reinforcement solution.

Furthermore, the chemical reinforcement may be a de-alkalization process. In this case, it is desirable that the polishing is performed so that the ski-jump value s and the roll-off value r become positive.

Still furthermore, other polishing may be performed to the main surface of the chemical reinforced glass substrate. In this case, the treatment conditions are adjusted so that the desirable edge profile is obtained after the other polishing.

In addition, the chemical reinforced glass substrate may be used for an optical disk, a magneto-optical disk, and the like.

What is claimed is:

1. A method of manufacturing a glass substrate for an information recording medium used in a hard disk drive, the glass substrate having an edge portion adjacent to an outer and/or an inner peripheral side end, comprising the steps of:

predicting a relationship between chemical reinforcement conditions and profile variation at the edge portion of the glass substrate which results from chemical reinforcement, to decide a profile on the edge portion prior to chemical reinforcement; and performing the chemical reinforcement to obtain the glass substrate which has a desired profile at the edge portion so as to stabilize flight of a magnetic head of the hard disk drive and to avoid crashing with the magnetic head.

2. A method as claimed in claim 1, wherein the chemical reinforcement performing step is performed on conditions such that the profile variation on the edge portion becomes small.

3. A method as claimed in claim 1, wherein the chemical reinforcement performing step is performed under the chemical reinforcement condition such that a compressive stress layer formed on a surface layer of the glass substrate by the chemical reinforcement reaches to a depth between 3 and 100 μm and has a compressive stress of 1–15 kg/mm² and that a tensile stress caused by the chemical reinforcement within the glass substrate is not larger than 4.5 kg/mm².

4. A method as claimed in claim 1, wherein the chemical reinforcement condition defines a processing temperature and a processing time during the chemical reinforcement.

5. A method as claimed in claim 4, wherein the processing temperature and the processing time fall with a range between 280° C. and 400° C. and a duration between 0.5 and 5 hours, respectively.

6. A method as claimed in claim 1, the glass substrate prior to chemical reinforcement having a main surface chamfered and polished together with the edge portion adjacent to the outer and/or the inner peripheral side end, wherein the predicting step further predicts an additional relationship between a polishing condition of the main surface and an edge profile obtained on the basis of the polishing condition; wherein the method further comprises the step of:

obtaining the glass substrate prior to chemical reinforcement by controlling the polishing condition of the main surface on the basis of the above-mentioned relationship between the polishing condition and the edge profile.

7. A method as claimed in claim 6, wherein the polishing condition is determined such that the edge portion is polished to be put into a surface down state lowered relative to the main surface of the glass substrate.

8. A method as claimed in claim 7, wherein the polishing condition determined for the surface down state is defined such that use is made about a soft polisher of a hardness between 60 and 80 (Asker-C) and a surface pressure to the glass substrate is kept at a range between 40 and 150 kg/cm² during polishing.

9. A method of manufacturing an information recording medium from the glass substrate claimed in claim 6, further comprising the step of:

depositing a recording layer on the main surface of the glass substrate.

* * * * *